(12) United States Patent
Wulff et al.

(10) Patent No.: US 7,632,902 B2
(45) Date of Patent: Dec. 15, 2009

(54) METHOD FOR PRODUCING AN AQUEOUS POLYMER DISPERSION

(75) Inventors: Dirk Wulff, Schifferstadt (DE); Jesper Feldthusen, Mainz (DE); Gerhard Auchter, Bad Duerkheim (DE); Gerald Wildburg, Speyer (DE); Ralf Fink, Schifferstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 273 days.

(21) Appl. No.: 10/513,335

(22) PCT Filed: May 21, 2003

(86) PCT No.: PCT/EP03/05309

§ 371 (c)(1),
(2), (4) Date: Nov. 12, 2004

(87) PCT Pub. No.: WO03/099889

PCT Pub. Date: Dec. 4, 2003

(65) Prior Publication Data

US 2005/0176865 A1      Aug. 11, 2005

(30) Foreign Application Priority Data

May 27, 2002   (DE) ................................. 10223615

(51) Int. Cl.
- *C08F 291/00* (2006.01)
- *C08F 2/24* (2006.01)
- *C08F 257/02* (2006.01)
- *C08F 265/04* (2006.01)
- *C08F 285/00* (2006.01)

(52) U.S. Cl. .................. 526/201; 524/457; 524/458; 525/201

(58) Field of Classification Search .............. 524/458, 524/457; 526/201; 525/201
See application file for complete search history.

(56) References Cited

U.S. PATENT DOCUMENTS

| 4,130,523 A | | 12/1978 | Hoy et al. |
| 4,427,836 A | * | 1/1984 | Kowalski et al. ............ 525/301 |
| 4,997,859 A | | 3/1991 | Min et al. |
| 5,304,707 A | * | 4/1994 | Blankenship et al. ....... 588/255 |

FOREIGN PATENT DOCUMENTS

| DE | 31 47 008 | | 6/1983 |
| DE | 33 19 340 | | 11/1984 |
| DE | 43 07 683 | | 9/1994 |
| DE | 196 28 142 | | 1/1998 |
| DE | 196 33 967 | | 2/1998 |
| EP | 0 222 127 | | 5/1987 |
| EP | 0 784 060 | | 7/1997 |
| EP | 0 890 593 | | 1/1999 |
| EP | 1086965 | * | 3/2001 |

* cited by examiner

*Primary Examiner*—Kelechi C Egwim
(74) *Attorney, Agent, or Firm*—Oblon, Spivak, McClelland, Maier & Neustadt, L.L.P.

(57) ABSTRACT

The invention relates to a method for producing an aqueous polymer dispersion having a polymer solids content of ≧50% by weight by carrying out the radically initiated aqueous emulsion polymerization of ethylenically unsaturated compounds (monomers). The inventive method is characterized in that: a) a mixture is provided in a polymerization vessel and contains a partial quantity 1 consisting of: deionized water, 0.001 to 0.5 parts by weight of a polymer with a weighted average particle diameter of ≦100 nm; 0.0001 to 0.1 parts by weight of dispersants, and 0.5 to 10 parts by weight of monomers, and the monomers are polymerized with a conversion of ≧80% [polymerization step A], and; b) afterwards, a monomer emulsion containing partial quantity 2, which consists of deionized water, 0.1 to 5 parts by weight of dispersants and 90 to 99.5 parts by weight of monomers, is fed under polymerization conditions to the obtained reaction mixture [polymerization step B], whereby; c) the total amount of the monomers used for the polymerization is equal to 100 parts by weight, and the total amount of deionized water is ≦100 parts by weight.

26 Claims, No Drawings

US 7,632,902 B2

METHOD FOR PRODUCING AN AQUEOUS POLYMER DISPERSION

BACKGROUND OF THE INVENTION

1. Field of the Invention

The present invention relates to a process for preparing an aqueous polymer dispersion having a polymer solids content ≧50% by weight by free-radically initiated aqueous emulsion polymerization of ethylenically unsaturated compounds (monomers), which comprises
a) charging a mixture comprising

| portion 1 | of deionized water, |
|---|---|
| from 0.001 to 0.5 part by weight | of polymer seed having a weight-average particle diameter ≦100 nm, |
| from 0.0001 to 0.1 part by weight | of dispersant, and |
| from 0.5 to 10 parts by weight | of monomers | to a polymerization vessel and polymerizing the monomers to a conversion ≧80% [stage A] and
b) subsequently supplying to the resultant reaction mixture under polymerization conditions a monomer emulsion comprising

| portion 2 | of deionized water, |
|---|---|
| from 0.1 to 5 parts by weight | of dispersant, and |
| from 90 to 99.5 parts by weight | of monomers |

[stage B], where
c) the total amount of monomers used for the polymerization is 100 parts by weight and the total amount of deionized water is ≦100 parts by weight.

The present specification further relates to the use of the aqueous polymer dispersions obtained by the process of the invention as binders, for modifying cement formulations and mortar formulations, and as adhesives, especially pressure sensitive adhesives.

2. Description of the Background

Like polymer solutions when the solvent evaporates, aqueous polymer dispersions, when the aqueous dispersion medium evaporates, display the property of forming polymer films, which is why aqueous polymer dispersions find application in a variety of ways as binders, for paints, for example, or for compositions used to coat leather, paper or polymer films.

Aqueous polymer dispersions with a high polymer fraction are of particular advantage in that, on the one hand, their relatively low proportion of aqueous dispersion medium reduces the energy required for evaporating it, for the purpose of forming films or for producing polymer powders, for example, and on the other hand, the useful polymer can be stored and transported using a relatively small amount of aqueous phase as carrier medium.

However, there is a disadvantage in that, as the volume concentration of the polymer increases (U.S. Pat. No. 4,130, 523), there are problems associated with the preparation of aqueous polymer dispersions. For instance, on the one hand, there is an increase in the flow resistance (the viscosity) which makes it more difficult both to dissipate the heat of reaction and to process the aqueous dispersion, and on the other hand there is an increase in the propensity of the dispersed polymer particles to aggregate for reasons of thermodynamic stability. The resulting flocs [a) microflocs or bits; not normally removable by conventional filtration; b) macroflocs or coagulum; normally removable by customary filtration] lead in particular to defects in the formation of films from the aqueous polymer dispersions, and are therefore generally unwanted.

According to studies into the flow resistance of aqueous polymer dispersions, those having a bimodal or broad size distribution (polydispersity) of the dispersed polymer particles for a given solids content are generally less resistant to flow than those having a narrow size distribution (which are in the extreme case monodisperse). Moreover, coarse aqueous polymer dispersions present a lower resistance to flow than do fine aqueous polymer dispersions, given the same solids content.

DE-A 19633967 discloses readily filterable and deodorizable, aqueous, pressure sensitive adhesive dispersions having solids contents of more than 65% by weight which are prepared by a special monomer feed process. Over the course of a quarter of an hour to an hour, from 1 to 10% by weight of the total monomer amount is metered in the form of a monomer emulsion at an increasing rate, after which the remainder of the monomer emulsion is run in continuously in the standard way.

DE-A 19628142 discloses aqueous polymer dispersions having solids contents ≧50% by weight and a bimodal particle size distribution. They are prepared by adding a monomer miniemulsion (average droplet size from 10 to 500 nm) during the polymerization. On an industrial scale, however, preparing a monomer miniemulsion requires additional costly homogenizing units, such as disperser discs or ultrasound devices, for example.

DE-A 4307683 describes an expensive and complex process for preparing an aqueous polymer dispersion having a solids volume concentration of ≧50%. A characteristic of this process is that an initial polymer dispersion in which at least 99.6% by weight of the polymer particles have a diameter ≧90 and ≦500 nm is introduced to the polymerization vessel as an initial charge before the actual emulsion polymerization. The subsequent emulsion polymerization is characterized by a two-stage monomer feed. The aqueous polymer dispersion which results has a polymodal particle size distribution. Additionally, DE-A 4307683 provides a good overview of the further state of the art.

DE-A 3147008 discloses a process for preparing bimodal aqueous polymer dispersions having a solids content ≧50% by weight, where prior to the actual emulsion polymerization a blend of two polymer dispersions differing in average particle size is added to the reaction vessel. A disadvantage of the process is the need to hold two aqueous polymer dispersions.

DE-A 3319340 describes a process for preparing bimodal or polymodal aqueous polymer dispersions with a solids content of up to 59% by weight. A characteristic of the process is that during the emulsion polymerization it is necessary to supply a seed latex to the reaction mixture before the monomer conversion exceeds 40%.

EP-A 784060 discloses a process for preparing bimodal aqueous polymer dispersions having a solids content ≧67% by weight and a viscosity ≦2000 mPa*s. The process is distinguished by the introduction as initial charge to a reaction vessel at polymerization temperature of an aqueous initiator solution with no emulsifier and the subsequent supply of a monomer mixture containing emulsifier. An essential feature of the process is that, after from 40 to 60% by weight of the monomer mixture have been metered in to the polymerization mixture, an additional quantity of emulsifier is added to the polymerization mixture.

A disadvantageous feature of the aforementioned processes is that in many cases, while giving good results on the laboratory scale, they are too complex or insufficiently reproducible for the industrial scale and, furthermore, exhibit long cycle times.

SUMMARY OF THE INVENTION

It is an object of the present invention to provide a process for preparing aqueous polymer dispersions having a solids content $\geq 50\%$ by weight, in which the disadvantages of the prior art are present, if at all, only to a reduced extent.

We have found that this object is achieved by the process defined at the outset.

DETAILED DESCRIPTION OF THE PREFERRED EMBODIMENTS

The totality of deionized water is composed of portions 1 and 2 and in accordance with the invention amounts to $\leq 100$ parts by weight per 100 parts by weight of total monomers employed. The totality of deionized water is frequently $\leq 80$ parts by weight, $\leq 70$ parts by weight and $\leq 65$ parts by weight, $\leq 60$ parts by weight, $\leq 55$ parts by weight, $\leq 50$ parts by weight or $\leq 45$ parts by weight, based on 100 parts by weight of total monomers employed. Portion 1 of deionized water frequently amounts to from 2.0 to 30 parts by weight and often from 5.0 to 20 parts by weight, based in each case on 100 parts by weight of total monomers employed.

The mixture initially charged to the polymerization vessel contains from 0.001 to 0.5 part by weight, frequently from 0.001 to 0.2 part by weight, and often from 0.005 to 0.1 part by weight of a polymer seed having a weight-average particle diameter $\leq 100$ nm. The weight-average particle diameter of the polymer seed used is frequently $\leq 80$ nm or $\leq 60$ nm and in particular $\leq 50$ nm or $\leq 40$ nm. Determination of the weight-average particle diameters is known to the skilled worker and is accomplished, for example, by the analytical ultracentrifuge method. For the purposes of this specification, the weight-average particle diameter is the weight-average $D_{w50}$ as determined by the analytical ultracentrifuge method (on this see S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175).

It is advantageous if the polymer seed used is monomodal and has a narrow particle size distribution. For the purposes of this specification, a narrow particle size distribution exists when the ratio of the weight-average particle diameter $D_{w50}$ to the number-average particle diameter $D_{N50}$ [$D_{w50}/D_{N50}$], as determined by the analytical ultracentrifuge method, is $\leq 2.0$, preferably $\leq 1.5$, and with particular preference $\leq 1.2$ or $\leq 1.1$.

The polymer seed is customarily used in the form of an aqueous polymer dispersion. The amounts indicated above refer to the polymer solids fraction of the aqueous polymer dispersion; they are therefore expressed as parts by weight of polymer seed solids per 100 parts by weight of monomers.

Preparation of a polymer seed is known to the skilled worker and is customarily accomplished by charging a relatively small amount of monomers and a relatively large amount of emulsifiers, together with deionized water, to a reaction vessel and adding a sufficient amount of polymerization initiator at reaction temperature.

In accordance with the invention it is preferred to use a polymer seed having a glass transition temperature of $\geq 50°$ C., frequently $\geq 60°$ C. or $\geq 70°$ C., and often $\geq 80°$ C. or $\geq 90°$ C. Particular preference is given to a polystyrene or polymethyl methacrylate polymer seed.

The amount of dispersant in the reaction mixture used in stage A of the polymerization is from 0.0001 to 0.1 part by weight, preferably from 0.0002 to 0.07 part by weight, and with particular preference from 0.0004 to 0.05 part by weight, based in each case on 100 parts by weight of total monomers employed.

The amount of monomers in stage A of the polymerization is from 0.5 to 10 parts by weight, preferably from 1.0 to 7.5 parts by weight, and with particular preference from 1.5 to 5.0 parts by weight.

Polymerization stage A is carried out by charging the abovementioned components to a reaction vessel and initiating free-radical polymerization by adding a suitable free-radical polymerization initiator. Essential to the process is the polymerization of the monomers to a conversion of at least 80%. More favorable, however, is a monomer conversion $\geq 90\%$, $\geq 95\%$ or $\geq 98\%$. Determination of the monomer conversion is known to the skilled worker and is accomplished, for example, by calorimetric methods.

Under polymerization conditions, i.e., in the presence of a suitable free-radical polymerization initiator, a monomer emulsion comprising portion 2 of deionized water, from 0.1 to 5.0 parts by weight, in particular from 0.5 to 3.0 parts by weight, of dispersant, and from 90 to 99.5 parts by weight, preferably from 92.5 to 99.0 parts by weight, and with particular preference from 95.0 to 98.5 parts by weight of monomers, is supplied continuously or discontinuously to the reaction mixture obtained from polymerization stage A. An advantageous feature of the process of the invention is that the monomer emulsion can be supplied rapidly, the rate of supply being limited essentially only by the maximum possible rate at which the heat of reaction can be removed from the polymerization vessel.

Suitable free-radical polymerization initiators include all those capable of triggering a free-radical aqueous emulsion polymerization. They may in principle comprise peroxides or azo compounds. Naturally, redox initiator systems are also suitable. Peroxides which can be used include, in principle, inorganic peroxides, such as hydrogen peroxide or peroxodisulfates, such as the mono- or di-alkali metal salts or ammonium salts of peroxodisulfuric acid, such as its mono- and di-sodium, -potassium or ammonium salts, for example, or organic peroxides, such as alkyl hydroperoxides, examples being tert-butyl, p-menthyl or cumyl hydroperoxide, and also dialkyl or diaryl peroxides, such as di-tert-butyl or dicumyl peroxide. Azo compounds employed include essentially 2,2'-azobis(isobutyronitrile), 2,2'-azobis(2,4-dimethylvaleronitrile) and 2,2'-azobis(amidinopropyl) dihydrochloride (as V-50 from Wako Chemicals). Suitable oxidizing agents for redox initiator systems include essentially the abovementioned peroxides. As corresponding reducing agents it is possible to use compounds of sulfur with a low oxidation state, such as alkali metal sulfites, e.g., potassium and/or sodium sulfite, alkali metal hydrogen sulfites, e.g., potassium and/or sodium hydrogen sulfite, alkali metal metabisulfites, e.g., potassium and/or sodium metabisulfite, formaldehyde-sulfoxylates, e.g., potassium and/or sodium formaldehyde-sulfoxylate, alkali metal salts, especially potassium and/or sodium salts, of aliphatic sulfinic acids, and alkali metal hydrogen sulfides, such as potassium and/or sodium hydrogen sulfide, for example, salts of polyvalent metals, such as iron(II) sulfate, iron(II) ammonium sulfate, and iron(II) phosphate, enediols, such as dihydroxymaleic acid, benzoin and/ or ascorbic acid, and also reducing saccharides, such as sorbose, glucose, fructose and/or dihydroxyacetone. In general the amount of polymerization initiator in stage A is from 0.01 to 0.5 part by weight and in particular from 0.05 to 0.2 part by weight and in stage B is from 0.05 to 5.0 parts by weight and in particular from 0.1 to 1.0 part by weight, based in each case on 100 parts by weight of total monomers employed.

The manner in which the polymerization initiator is added to the polymerization mixture tends to be of minor significance for the success of the process of the invention. In both stages A and B of the polymerization, the polymerization initiator may be included in its entirety in the initial charge to the polymerization vessel or else added, continuously or in stages, at the rate at which it is consumed in the course of the free-radical aqueous emulsion polymerization. Specifically this will depend, in a manner known per se to the skilled worker, both on the chemical nature of the initiator system and on the polymerization temperature.

In order to set the molecular weight it is additionally possible where appropriate to add molecular weight regulators known to the skilled worker, customarily in amounts of from 0.1 to 5% by weight, based on the total amount of the monomers, examples being alcohols, such as butenediol or isopropanol, mercapto compounds, such as 2-mercaptoethanol or tert-dodecyl mercaptan, or haloform compounds, such as bromoform or chloroform.

A suitable reaction temperature for the free-radical aqueous emulsion polymerization in stages A and B encompasses the entire range from 0 to 170° C. The temperatures used are generally from 50 to 120° C., frequently from 60 to 110° C., and often $\geq$70 to 100° C. The free-radical aqueous emulsion polymerization may be conducted at a pressure less than, equal to or greater than 1 bar (absolute). Highly volatile monomers such as ethylene, butadiene or vinyl chloride are preferably polymerized under superatmospheric pressure. The pressure in this case may assume values of 1.2, 1.5, 2, 5, 10, 15 bar or even higher. Where emulsion polymerizations are conducted under subatmospheric pressure, the pressures set are $\leq$950 mbar, frequently $\leq$900 mbar, and often $\leq$850 mbar (absolute). Both in stage A and in stage B, the free-radical aqueous emulsion polymerization is advantageously conducted under an inert gas atmosphere, such as under nitrogen or argon, for example.

In stage B of the polymerization the monomers are likewise customarily polymerized to a conversion of at least 80%, although generally a monomer conversion $\geq$90%, $\geq$95% or $\geq$98% is preferred.

In many cases, the residual amounts of unreacted monomers in the aqueous polymer dispersions obtained are lowered by chemical and/or physical methods which are likewise known to the skilled worker [see, for example, EP-A 771328, DE-A 19624299, DE-A 19621027, DE-A 19741184, DE-A 19741187, DE-A 19805122, DE-A 19828183, DE-A 19839199, DE-A 19840586 and 19847115] and/or further customary additives, such as bactericides or foam suppressants, are added to the aqueous polymer dispersions.

Suitable monomers for preparing the aqueous polymer dispersions include in particular ethylenically unsaturated monomers which readily undergo free-radical polymerization, such as ethylene, vinylaromatic monomers, such as styrene, α-methylstyrene, o-chlorstyrene or vinyletoluenes, vinyl halides, such as vinyl chloride or vinylidene chloride, esters of vinyl alcohol and $C_1$ to $C_{18}$ monocarboxylic acids, such as vinyl acetate, vinyl propionate, vinyl n-butyrate, vinyl laurate, and vinyl stearate, esters of preferably $C_3$ to $C_6$ α,β-monoethylenically unsaturated mono- and dicarboxylic acids, such as particularly acrylic, methacrylic, maleic, fumaric and itaconic acids, with generally $C_1$ to $C_{12}$, preferably $C_1$ to $C_8$, and in particular $C_1$ to $C_4$ alkanols, such as particularly methyl, ethyl, n-butyl, isobutyl, pentyl, hexyl, heptyl, octyl, nonyl, decyl and 2-ethylhexyl acrylates and methacrylates, dimethyl or di-n-butyl fumarate and maleate, nitriles of α,β-monoethylenically unsaturated carboxylic acids, such as acrylonitrile, methacrylonitrile, fumaronitrile and maleonitrile, and also $C_{4-8}$ conjugated dienes, such as 1,3-butadiene and isoprene. These monomers generally form the principal monomers, which, based on the total monomer amount, account for a fraction of more than 50% by weight, preferably more than 80% by weight. As a general rule these monomers are of only moderate to low solubility in water under standard conditions [20° C., 1 bar (absolute)].

Monomers which have higher solubility in water under the aforementioned conditions are those which contain either at least one acid group and/or its corresponding anion or at least one amino, amido, ureido or N-heterocyclic group and/or its ammonium derivatives which are alkylated or protonated on the nitrogen. By way of example, mention may be made of α,β-monoethylenically unsaturated mono- and dicarboxylic acids and their amides, such as acrylic acid, methacrylic acid, maleic acid, fumaric acid, itaconic acid, acrylamide, and methacrylamide, for example, and also vinylsulfonic acid, 2-acrylamido-2-methylpropanesulfonic acid, styrenesulfonic acid and the water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino) ethyl acrylate, 2-(N,N-diethylamino)ethyl methacrylate, 2-(N-tert-butylamino)ethyl methacrylate, N-(3-N,N'-dimethylaminopropyl)methacrylamide, and 2-(1-imidazolin-2-onyl)ethyl methacrylate. The abovementioned monomers are normally used only as modifying monomers, in amounts, based on the total monomer amount, of less than 10% by weight, preferably less than 5% by weight.

Monomers which customarily raise the internal strength of the films formed from the polymer matrix normally possess at least one epoxy, hydroxy, N-methylol or carbonyl group, or at least two nonconjugated ethylenically unsaturated double bonds. Examples thereof are monomers containing two vinyl radicals, monomers containing two vinylidene radicals, and monomers containing two alkenyl radicals. Particularly advantageous are the diesters of dihydric alcohols with α,β-monoethylenically unsaturated monocarboxylic acids, among which acrylic acid and methacrylic acid are preferred. Examples of monomers of this kind containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate, and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Of particular importance in this context as well are the $C_1$-$C_8$ hydroxyalkyl esters of methacrylic and acrylic acid such as n-hydroxyethyl, n-hydroxypropyl or n-hydroxybutyl acrylate and methacrylate, and also compounds such as diacetoneacrylamide and acetylacetoxyethyl acrylate and methacrylate. The aforementioned monomers are frequently used in amounts of up to 10% by weight, but preferably less than 5% by weight, based in each case on the total monomer amount.

Monomer mixtures which can be used very favorably in accordance with the invention are those containing

| | |
|---|---|
| from 50 to 99.9% by weight | of esters of acrylic and/or methacrylic acid with alkanols having from 1 to 12 carbon atoms and/or styrene, or |
| from 50 to 99.9% by weight | of styrene and/or butadiene, or |
| from 50 to 99.9% by weight | of vinyl chloride and/or vinylidene chloride, or |
| from 40 to 99.9% by weight | of vinyl acetate, vinyl propionate and/or ethylene. |

In particular it is possible in accordance with the invention to use monomer mixtures containing

| | |
|---|---|
| from 0.1 to 5% by weight | of at least one $C_3$ to $C_6$ $\alpha,\beta$-monoethylenically unsaturated mono- or dicarboxylic acid and/or amide thereof and |
| from 50 to 99.9% by weight of | at least one ester of acrylic and/or methacrylic acid with $C_1$ to $C_{12}$ alkanols and/or styrene, or |
| from 0.1 to 5% by weight | of at least one $C_3$ to $C_6$ $\alpha,\beta$-monoethylenically unsaturated mono- or dicarboxylic acid and/or amide thereof and |
| from 50 to 99.9% by weight of | styrene and/or butadiene, or |
| from 0.1 to 5% by weight | of at least one $C_3$ to $C_6$ $\alpha,\beta$-monoethylenically unsaturated mono- or dicarboxylic acid and/or amide thereof and |
| from 50 to 99.9% by weight of | vinyl chloride and/or vinylidene chloride, or |
| from 0.1 to 5% by weight | of at least one $C_3$ to $C_6$ $\alpha,\beta$-monoethylenically unsaturated mono- or dicarboxylic acid and/or amide thereof and |
| from 40 to 99.9% by weight of | vinyl acetate, vinyl propionate and/or ethylene. |

It is important that in stages A and B of the polymerization the monomers and monomer mixtures may be identical or different. In stage B of the polymerization, too, it is possible to supply the monomers and monomer mixtures to the reaction mixture obtained from stage A in a staged or gradient procedure which is known to the skilled worker.

Depending on the intended use there is a need for aqueous polymer dispersions whose polymers have glass transition temperatures situated within specific ranges. Through a suitable selection of the monomers to be polymerized in stages A and B it is possible for the skilled worker to carry out targeted preparation of polymers whose glass transition temperatures lie within the desired range. At this point it should be pointed out that in the context of this specification the term monomer embraces monomer mixtures as well and the term polymer also embraces copolymers.

Where, for example, the polymers of the aqueous polymer dispersions are to be used as adhesives, especially pressure sensitive adhesives, the composition of the monomer mixture to be polymerized is chosen so that the polymers formed have a glass transition temperature <0° C., frequently ≦5° C., and often ≦10° C.

Where the polymers are used as binders the compositions of the monomer mixtures to be polymerized are chosen so that the polymers formed have glass transition temperatures of from −60° C. to +50° C. and, for use as additives to cement formulations and mortar formulations, glass transition temperatures of from −15° C. to +30° C.

The glass transition temperature, $T_g$, is the limiting value of the glass transition temperature toward which it tends with increasing molecular weight, according to G. Kanig (Kolloid-Zeitschrift & Zeitschrift für Polymere, Vol. 190, page 1, equation 1). The glass transition temperature is determined by the DSC method (differential scanning calorimetry, 20 K/min, midpoint measurement, DIN 53 765).

According to Fox (T.G. Fox, Bull. Am. Phys. Soc. 1956 [Ser. II] 1, page 123 and in accordance with Ullmann's Encyclopädie der technischen Chemie, Vol. 19, page 18, 4$^{th}$ edition, Verlag Chemie, Weinheim, 1980) the glass transition temperature of copolymers with no more than slight levels of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2 \ldots T_g^n$ are the glass transition temperatures of the polymers composed in each case of only one of the monomers 1, 2 ... n, in degrees Kelvin. $T_g$ values for the homopolymers of the majority of monomers are known and are listed, for example, in Ullmann's Encyclopedia of Industrial Chemistry, Vol. A21, page 169, 5$^{th}$ edition, VCH Weinheim, 1992; further sources of homopolymer glass transition temperatures include, for example, J. Brandrup, E. H. Immergut, Polymer Handbook, 1$^{st}$ Ed., J. Wiley, New York 1966, 2$^{nd}$ Ed. J. Wiley, New York 1975, and 3$^{rd}$ Ed. J. Wiley, New York 1989.

The dispersants used in the context of the process of the invention are capable of maintaining both the monomer droplets and the polymer particles in disperse distribution in the aqueous phase and so of ensuring the stability of the aqueous polymer dispersion produced. Suitable such dispersants include emulsifiers and the protective colloids commonly used for conducting free-radical aqueous emulsion polymerizations.

Suitable protective colloids are, for example, polyvinyl alcohols, cellulose derivatives, or vinylpyrrolidone copolymers. A detailed description of further suitable protective colloids can be found in Houben-Weyl, Methoden der organischen Chemie, Volume XIV/1, Makromolekulare Stoffe, pages 411 to 420, Georg-Thieme-Verlag, Stuttgart, 1961. Mixtures of emulsifiers and/or protective colloids can of course also be used. As dispersants it is preferred to use exclusively emulsifiers, whose relative molecular weights, unlikely those of the protective colloids, are usually below 1000. They may be anionic, cationic or nonionic in nature. Where mixtures of surface-active substances are used the individual components must of course be compatible with one another, something which in case of doubt can be checked by means of a few preliminary tests. Generally speaking, anionic emulsifiers are compatible with one another and with nonionic emulsifiers. The same is true of cationic emulsifiers, while anionic and cationic emulsifiers are usually not compatible with one another. Examples of commonly used emulsifiers are ethoxylated mono-, di- and trialkylphenols (EO units: 3 to 50, alkyl: $C_4$ to $C_{12}$), ethoxylated fatty alcohols (EO units 3 to 50; alkyl: $C_8$ to $C_{36}$) and also the alkali metal and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$). Further suitable emulsifiers can be found in Houben-Weyl, Methoden der organischen Chemie, Volume XIV/1, Makromolekulare Stoffe, pages 192 to 208, Georg-Thieme-Verlag, Stuttgart, 1961.

Further surface-active substances found include compounds of the formula I

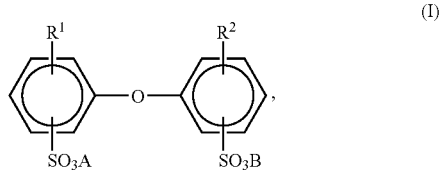

where $R^1$ and $R^2$ are $C_4$ to $C_{24}$ alkyl and one of the radicals $R^1$ or $R^2$, may also stand for hydrogen, and A and B can be alkali metal ions and/or ammonium ions. In the formula I $R^1$ and $R^2$ are preferably linear or branched alkyl radicals having from 6 to 18 carbon atoms, especially having 6, 12, and 16 carbon atoms, or hydrogen atoms, although $R^1$ and $R^2$ are not both simultaneously hydrogen atoms. A and B are preferably sodium, potassium or ammonium ions, sodium ions being particularly preferred. Particularly advantageous compounds I are those in which A and B are sodium ions, $R^1$ is a branched alkyl radical having 12 carbon atoms, and $R^2$ is a hydrogen atom or $R^1$. Use is frequently made of technical-grade mixtures which have a fraction of from 50 to 90% by weight of the monoalkylated product, an example being Dowfax® 2A1 (brand name of Dow Chemical Company). The compounds I are general knowledge, for example, from U.S. Pat. No. 4 269 749, and are available commercially.

For the process of the invention it is preferred to use nonionic and/or anionic dispersants.

The aqueous polymer dispersions of the invention generally have a bimodal particle size distribution. Customarily, one maximum is in the particle size range <400 nm, frequently <300 nm, and often <200 nm, and one maximum is in the particle size range $\geq$400 nm, frequently $\geq$500 nm, and often $\geq$600 nm. In general, the weight fraction of the polymer particles having a weight-average diameter <400 nm is $\leq$50% by weight, frequently $\leq$45% by weight, and often $\leq$40% by weight. Again, the particle size distribution is generally determined by the analytical ultracentrifuge method.

By means of the process of the invention it is possible to obtain aqueous polymer dispersions whose solids content is $\geq$50% by weight or $\geq$55% by weight, frequently $\geq$60% by weight or $\geq$65% by weight, and often $\geq$70% by weight.

Aqueous polymer dispersions prepared by the process of the invention described are suitable as base materials for preparing adhesives, such as pressure sensitive adhesives, construction adhesives or industrial adhesives, for example, or for preparing binders, such as for paper coating, emulsion paints or for printing inks and print varnishes for printing polymer films, for example, for producing nonwovens, and for producing protective coats and water vapor barriers, such as in the context of priming, for example. Furthermore, the dispersions available to the process of the invention may also be utilized for modifying cement formulations and mortar formulations.

It should also be noted that the aqueous dispersions obtainable in accordance with the invention can easily be dried to form redispersible polymer powders (by freeze drying or spray drying, for example). This is especially so when the glass transition temperature of the polymer particles is $\geq$50° C., preferably $\geq$60° C., with particular preference $\geq$70° C., with very particular preference $\geq$80° C., and with especial preference $\geq$90° C. or $\geq$100° C.

The present process of the invention is notable for its ease of implementation, its high reproducibility, and its short cycle times. In addition, through the present invention a process is provided which by initially introducing only one polymer seed with a weight-average particle diameter $\leq$100 nm allows access to bimodal polymer dispersions in which the weight fraction of polymer particles having a weight-average diameter $\geq$400 nm is generally >50% by weight. Additionally, aqueous polymer dispersions having a solids content $\geq$50% by weight are obtained which feature low coagulum contents.

EXAMPLES

Analysis

The solids contents were determined by drying an aliquot in a drying oven at 140° C. for 6 hours. Two separate measurements were conducted in each case. The figure indicated in each of the examples represents the average of the two measurements.

The particle sizes and their distribution were determined by the analytical ultracentrifuge method (W. Mächtle, Makromolekulare Chemie, 185 (1984) pages 1025 to 1039).

The viscosities reported (mPa*s) were determined by the Brookfield method to ISO 2555 using a rotational viscometer.

The levels of coagulum were determined from the sieve residue, for which in a modification of DIN 53786 1 kg of each aqueous polymer dispersion was filtered through a sieve with a mesh size of 0.125 mm. The residue on the sieve was washed with deionized water, dried, and subsequently weighed. The figures are given as percentages, based on the aqueous polymer dispersion. Two separate measurements are conducted in each case. The figure reported in each of the examples represents the average of the two measurements.

The K values of the polymers were determined in general in accordance with H. Fikentscher, Cellulosechemie 1932 (13) pages 58 to 64 and 71 to 74, where $K=k\times10^3$. The measurements were made at 25° C. on 1% strength by weight solution of the polymers in THF (in accordance with DIN ISO 1628-1).

Example 1

A 1 m³ polymerization vessel with stirrer was charged at from 20 to 25° C. (room temperature) with

| | |
|---|---|
| 85.80 kg | of deionized water, |
| 0.10 kg | of an aqueous polymer latex (prepared by free-radically initiated | emulsion polymerization of styrene; polymer solids content 33% by weight) having a weight-average particle diameter $D_{w50}$ of 30 nm,

| | |
|---|---|
| 0.02 kg | of sodium p-dodecylphenylsulfonate, |
| 0.45 kg | of styrene, |
| 1.64 kg | of methyl methacrylate, |
| 1.58 kg | of vinyl acetate |
| 16.36 kg | of 2-ethyihexyl acrylate, and |
| 10.50 kg | of feed stream II | and this initial charge was heated to 85° C. with stirring under a nitrogen atmosphere and stirred at this temperature for 15 minutes. The monomer conversion was >95%. Thereafter, with stirring and with the reaction temperature maintained, and commencing simultaneously, the remainder of feed stream II was metered in over the course of 4 hours and feed stream I was metered in at a constant feed flow rate of 231.8 liters were hour. Thereafter the reaction mixture was cooled to 70° C. and at this temperature, commencing simultaneously, feed streams III and IV were added in parallel over the course of 1 hour. Then 4 bar steam was introduced into the reaction vessel for 3 hours, at the same temperature and with continued stirring, in the course of which the steam which emerged was passed to a condenser in order to separate out volatile constituents. Aqueous polymer dispersion entrained in this condensation was separated off and passed back to the polymerization vessel. The batch was then cooled to room temperature.

Feed stream I is an aqueous monomer emulsion prepared from:

| | |
|---|---|
| 74.90 kg | of deionized water, |
| 20.10 kg | of a 35% strength by weight aqueous solution of the sodium salt of a sulfuric monoester of ethoxylated isooctylphenol, average degree of ethoxylation: 25 [Emulphor ® NPS, brand name of BASF AG] |
| 4.95 kg | of a 25% strength by weight aqueous solution of sodium vinylsulfonate, |
| 14.74 kg | of a 20% strength by weight aqueous solution of sodium laurylsulfonate, |
| 14.03 kg | of a 10% strength by weight aqueous solution of sodium hydroxide, |
| 13.33 kg | of styrene, |
| 53.36 kg | of methyl methacrylate, |
| 53.38 kg | of vinyl acetate, |
| 528.71 kg | of 2-ethylhexyl acrylate, and |
| 3.57 kg | of acrylic acid. |

Feed stream II:
65.50 kg of a 7% strength by weight aqueous solution of sodium peroxodisulfate.

Feed stream III:
6.97 kg of a 10% strength by weight aqueous solution of tert-butyl hydroperoxide Feed stream IV is a reducing agent solution prepared from:

| | |
|---|---|
| 0.69 kg | of sodium bisulfite, |
| 0.43 kg | of acetone, and |
| 11.10 kg | of deionized water. |

To test the reproducibility, the polymerization was repeated a total of five times. As can be seen from Table 1, the resultant dispersions D1 to D5 exhibit only slight deviations in the parameters determined, such as solids contents, K values, position of the two maxima in the particle size distribution, coagulum contents or viscosities.

Comparative Example C1 (in Analogy to Example 1 of DE-A 19633967)

Example 1 was repeated except that the polymerization vessel was charged with only

| | |
|---|---|
| 85.80 kg | of deionized water, |
| 0.02 kg | of sodium p-dodecylphenylsulfonate, and |
| 10.50 kg | of feed stream II | and feed stream I consisted of

| | |
|---|---|
| 74.90 kg | of deionized water, |
| 20.10 kg | of a 35% strength by weight aqueous solution of Emuiphor ® NPS, |
| 4.95 kg | of a 25% strength by weight aqueous solution of sodium vinylsulfonate, |
| 14.74 kg | of a 20% strength by weight aqueous solution of sodium laurylsulfonate, |
| 14.03 kg | of a 10% strength by weight aqueous solution of sodium hydroxide, |
| 13.78 kg | of styrene, |
| 55.00 kg | of methyl methacrylate, |
| 54.96 kg | of vinyl acetate, |
| 545.07 kg | of 2-ethylhexyl acrylate, and |
| 3.57 kg | of acrylic acid. |

In addition, after a reaction temperature of 85° C. had been reached, feed stream I was metered in for 6 minutes at a feed rate of 46.36 liters per hour and then increased continuously over the course of 40 minutes to a feed rate of 231.8 liters per hour and was left at this feed rate until the end of feed stream I. The remainder of feed stream II was added to the polymerization vessel continuously over the course of 5 hours, commencing simultaneously with feed stream I. All further steps in the process were carried out in accordance with Example 1. The parameters determined from the comparative experiment are likewise listed in Table 1.

TABLE 1

Comparison of the values resulting from dispersions D1 to D5 and C1

|  |  | Dispersion | | | | | |
|---|---|---|---|---|---|---|---|
|  |  | D1 | D2 | D3 | D4 | D5 | C1 |
| Solids content (% by weight) | | 70 | 69 | 71 | 70 | 69 | 70 |
| K value | | 92 | 90 | 89 | 88 | 91 | 85 |
| Particle size distribution | Maximum 1 (nm) | 150 | 155 | 160 | 150 | 155 | 210 |
| | Maximum 2 (nm) | 680 | 660 | 650 | 670 | 650 | 720 |
| | Particles <400 nm (% by weight) | 38 | 40 | 42 | 37 | 36 | 32 |
| | Particles ≧400 nm (% by weight) | 62 | 60 | 58 | 63 | 64 | 68 |
| Coagulum content (% by weight) | | 0.007 | 0.009 | 0.010 | 0.010 | 0.008 | 0.014 |
| Viscosity (mPa * s) | | 669 | 645 | 682 | 658 | 652 | 635 |

As can be seen from Table 1, the essential differences between the dispersions D1 to D5 of the invention and the comparative dispersion C1 are essentially in the K value, in the particle size distribution, and in the coagulum content. It is also significant that the total cycle time of C1 in comparison to D1 to D5 is approximately 45 minutes higher.

We claim:

1. A process for preparing an aqueous polymer dispersion by free-radically initiated aqueous emulsion polymerization of a combination of ethylenically unsaturated compounds (monomers), wherein all amounts in parts by weight are based on 100 parts by weight of the monomers, which comprises:
   a) charging a mixture (i) comprising:
   an amount of deionized water (portion 1), from 0.001 to 0.5 part by weight of polymer seed having a weight-average particle diameter ≦100 nm, from 0.0001 to 0.1 part by weight of dispersant, and from 0.5 to 10 parts by weight of monomers to a polymerization vessel and polymerizing the monomers to a conversion >80% [stage A] and
   b) subsequently supplying to the resultant reaction mixture under polymerization conditions an emulsion (ii) comprising:
   an amount of deionized water (portion 2), from 0.1 to 5 parts by weight of dispersant, and from 90 to 99.5 parts by weight of monomers, and polymerizing the monomers [stage B], where
   c) the total amount of monomers is 100 parts by weight, the total amount of deionized water (portion 1+portion 2) is less than 100 parts by weight, and the aqueous polymer dispersion has a polymer solids content of at least 60% by weight.

2. The process as claimed in claim 1, wherein portion 1 of deionized water ranges from 2.0 to 30 parts by weight.

3. The process as claimed in claim 1, wherein said dispersant comprises emulsifiers.

4. The process as claimed in claim 3, wherein said dispersant comprises nonionic and/or anionic emulsifiers.

5. The process as claimed in claim 1, wherein said polymer seed has a weight-average particle diameter ≧50 nm.

6. The process as claimed in claim 1, wherein the amount of said polymer seed ranges from 0.001 to 0.2 part by weight.

7. The process as claimed in claim 1, wherein said polymer seed has a weight-average particle diameter ≧40 nm.

8. The process as claimed in claim 1, wherein the amount of monomers in mixture (i) ranges from 1.0 to 7.5 parts by weight and the amount of monomers in emulsion (ii) ranges from 92.5 to 99.0 parts by weight.

9. The process as claimed in claim 1, wherein the amount of monomers in mixture (i) ranges from 1.5 to 5.0 parts by weight and the amount of monomers in emulsion (ii) ranges from 95.0 to 98.5 parts by weight.

10. The process as claimed in claim 1, wherein said combination of ethylenically unsaturated compounds comprises mixtures containing

| from 50 to 99.9% by weight | of esters of acrylic and/or methacrylic acid with alkanols having from 1 to 12 carbon atoms and/or styrene, or |
|---|---|
| from 50 to 99.9% by weight | of styrene and/or butadiene, or |
| from 50 to 99.9% by weight | of vinyl chloride and/or vinylidene chloride, or |
| from 40 to 99.9% by weight | of vinyl acetate, vinyl propionate and/or ethylene. |

11. The process as claimed in claim 1, wherein the polymer dispersion having a bimodal particle size distribution in which one maximum is in the particle size range of <400 nm and the other maximum is in the particle size range of ≧400 nm.

12. The process as claimed in claim 1, wherein the polymer solids content is at least 65% by weight.

13. The process as claimed in claim 1, wherein the polymer solids content is at least 70% by weight.

14. The process as claimed in claim 1, wherein the monomers in stage A contain no carboxyl group.

15. The process as claimed in claim 1, wherein all monomers present in stage A are present in stage B.

16. The process as claimed in claim 1, wherein the polymer seed is monomodal.

17. The process as claimed in claim 1, wherein the polymer seed has a weight-average particle diameter $D_{W50}$ to number-average particle diameter $D_{N50}$ ($D_{W50}/D_{N50}$) of ≧2.0.

18. The process as claimed in claim 17, wherein $D_{W50}/D_{N50}$ is ≧1.1.

19. The process as claimed in claim 1, wherein the polymer seed comprises polystyrene.

20. The process as claimed in claim 1, wherein the polymer seed comprises polymethyl methacrylate.

21. The process as claimed in claim 1, wherein the amount of dispersant in stage A is 0.0004 to 0.05 parts.

22. The process as claimed in claim 1, wherein the total amount of deionized water (portion 1+portion 2) is $\leqq 45$ parts by weight.

23. The process as claimed in claim 1, wherein the amount of portion 1 deionized water is from 5 to 20 parts by weight.

24. The process as claimed in claim 11, wherein the weight fraction of polymer particles having a weight-average diameter of $\geqq 400$ nm is >50% by weight.

25. The process as claimed in claim 1, wherein the amount of said polymer seed ranges from 0.005 to 0.1 part by weight.

26. The process as claimed in claim 9, wherein the amount of said polymer seed ranges from 0.005 to 0.1 part by weight.

* * * * *

UNITED STATES PATENT AND TRADEMARK OFFICE
CERTIFICATE OF CORRECTION

PATENT NO. : 7,632,902 B2 Page 1 of 1
APPLICATION NO. : 10/513335
DATED : December 15, 2009
INVENTOR(S) : Wulff et al.

It is certified that error appears in the above-identified patent and that said Letters Patent is hereby corrected as shown below:

On the title page, Item (75), the Inventors' information is incorrect. Item (75) should read:

-- (75) Inventors: Dirk Wulff, Schifferstadt (DE); Jesper Feldthusen Jensen, Mainz (DE); Gerhard Auchter, Bad Duerkheim (DE); Gerald Wildburg, Speyer (DE); Ralf Fink, Schifferstadt (DE) --

Signed and Sealed this

Ninth Day of February, 2010

David J. Kappos
*Director of the United States Patent and Trademark Office*